(12) United States Patent
Takeda

(10) Patent No.: US 11,491,531 B2
(45) Date of Patent: Nov. 8, 2022

(54) WORKPIECE CONVEYANCE DEVICE

(71) Applicant: AIDA ENGINEERING, LTD., Kanagawa (JP)

(72) Inventor: Keisuke Takeda, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 220 days.

(21) Appl. No.: 16/750,456

(22) Filed: Jan. 23, 2020

(65) Prior Publication Data
US 2020/0230687 A1 Jul. 23, 2020

(30) Foreign Application Priority Data

Jan. 23, 2019 (JP) .............................. JP2019-009475
Aug. 22, 2019 (JP) .............................. JP2019-151843

(51) Int. Cl.
*B25J 9/04* (2006.01)
*B21D 43/00* (2006.01)
(Continued)

(52) U.S. Cl.
CPC .......... *B21D 43/003* (2013.01); *B25J 9/0084* (2013.01); *B25J 9/042* (2013.01); *B25J 17/0208* (2013.01);
(Continued)

(58) Field of Classification Search
CPC ....... B25J 17/0208; B25J 9/0084; B25J 9/042
See application file for complete search history.

(56) References Cited

U.S. PATENT DOCUMENTS

2005/0178641 A1* 8/2005 Yoshida ............... B23Q 1/5468
198/468.4
2018/0361521 A1* 12/2018 Takeda ................. B23Q 7/1405
2019/0234480 A1* 8/2019 Bu ......................... F16F 15/022

FOREIGN PATENT DOCUMENTS

CN 106695797 A 5/2017
DE 3912036 C1 * 7/1990 ............ B25J 9/0084
(Continued)

OTHER PUBLICATIONS

Extended European Search Report issued in corresponding European Patent Application No. 20153121.7, dated May 20, 2020.
(Continued)

*Primary Examiner* — Gerald McClain
(74) *Attorney, Agent, or Firm* — McDermott Will & Emery LLP

(57) ABSTRACT

A workpiece conveyance device includes a base body disposed adjacent to a press machine, a pair of first arms, a pair of second arms, and a first holding portion and a second holding portion independent of each other. Each of the first holding portion and the second holding portion includes a plurality of holding members configured to hold a workpiece W. The first holding portion includes a first support member, a second support member, and an absorption member. The second support member movably supports the first support member along an intersection direction. The absorption member allows movement of the second support member caused in the intersection direction relative to the first support member, and makes it possible for the second support member to return to an initial position in the intersection direction relative to the first support member.

18 Claims, 14 Drawing Sheets

(51) Int. Cl.
  *F16F 15/04* (2006.01)
  *B25J 17/02* (2006.01)
  *B25J 9/00* (2006.01)
  *F16F 15/03* (2006.01)
  *F16F 15/023* (2006.01)

(52) U.S. Cl.
  CPC .......... *F16F 15/046* (2013.01); *F16F 15/023* (2013.01); *F16F 15/03* (2013.01)

(56) References Cited

FOREIGN PATENT DOCUMENTS

| | | | |
|---|---|---|---|
| DE | 3912036 C1 | 7/1990 | |
| DE | 10201005194 7 A1 | 5/2012 | |
| DE | 102010051947 A1 * | 5/2012 | .......... B25J 17/0208 |
| EP | 3415282 A1 | 12/2018 | |
| JP | 2007-216254 A | 8/2007 | |
| JP | 2009018380 A * | 1/2009 | |
| JP | 2009018380 A | 1/2009 | |
| JP | 2009-208080 A | 9/2009 | |
| JP | 2009208080 A * | 9/2009 | |
| WO | 2017203945 A1 | 11/2017 | |

OTHER PUBLICATIONS

Office Action issued from corresponding Japanese Application No. 2019-151843 dated Jul. 5, 2022, with English Translation.

* cited by examiner

WORKPIECE CONVEYANCE DEVICE

Japanese Patent Application No, 2019-009475 filed on Jan. 23, 2019 and Japanese Patent Application No. 2019-151843 filed on Aug. 22, 2019 are hereby incorporated by reference in their entireties.

BACKGROUND OF THE INVENTION

The present invention relates to a workpiece conveyance device for a press machine.

A workpiece conveyance device using two SCARA robot units has been proposed as a workpiece conveyance device configured to load a workpiece into a press machine and unload the workpiece from a press machine (for example, JP 2009-208080 A).

The workpiece conveyance device disclosed in JP 2009-208080 A includes a holding portion on the tip of each SCARA robot, and the each of holding portions of the robots holds a workpiece and conveys them to a press machine. The two holding portions are slidably coupled to each other. As a result, a conveyance trajectory of the workpiece by one SCARA robot and a conveyance trajectory of the workpiece by the other SCARA robot are substantially identical.

However, in the workpiece conveyance device of JP 2009-208080 A, when one workpiece is held by the two holding portions, the two holding portions move in a direction to be closer to or separate from each other, and thus there arises a risk that strain is generated in the workpiece. The movement of the holding portions may be caused by a backlash in gears in a joint portion of an arm bar constituting the SCARA robot and by inertial force accompanying the deceleration during the operation of arm extension.

SUMMARY

The present disclosure provides a workpiece conveyance device capable of reducing the generation of strain in a workpiece even when a single workpiece is conveyed.

According to a first aspect of the invention, there is provided a workpiece conveyance device including:
a base body disposed adjacent to a press machine;
a pair of first arms whose base ends are rotatably supported relative to the base body;
a pair of second arms whose base ends are rotatably supported at respective tips of the first arms; and
a pair of holding portions independent of each other and rotatably supported at respective tips of the second arms,
each of the holding portions including a plurality of holding members which holds a workpiece,
at least one of the holding portions including:
a first support member which supports the plurality of holding members;
a second support member rotatably supported at the tip of the second arm and supporting the first support member; and
an absorption member provided between the first support member and the second support member,
the second support member movably supporting the first support member along an intersection direction intersecting with a conveyance direction in which the workpiece is conveyed, and
the absorption member allowing movement of the second support member caused in the intersection direction relative to the first support member, and enabling the second support member to return to an initial position in the intersection direction relative to the first support member.

According to a second aspect of the invention, there is provided a workpiece conveyance device including:
a base body disposed adjacent to a press machine;
a pair of first arms whose base ends are rotatably supported relative to the base body;
a pair of second arms whose base ends are rotatably supported at respective tips of the first arms; and
a pair of holding portions independent of each other and rotatably supported at respective tips of the second arms,
in a state in which the pair of holding portions holds one workpiece, at least one of the holding portions being able to move the other one of the holding portions in a direction to be closer to or separate from the one of the holding portions, and to return the other one of the holding portions to an initial position in the direction.

Figure 1:
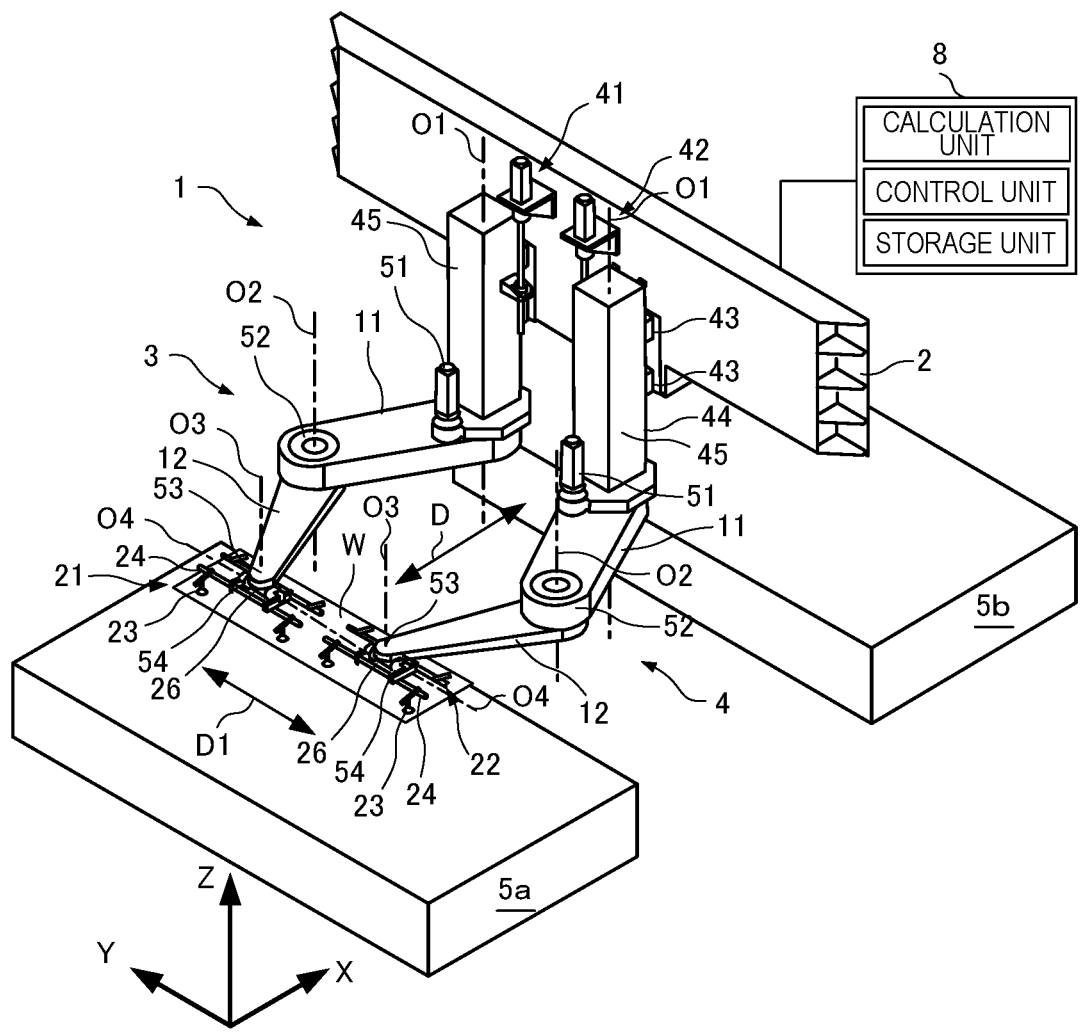
FIG. 1 is a perspective view illustrating an entire workpiece conveyance device according to an embodiment of the invention.

DETAILED DESCRIPTION OF THE EMBODIMENT (1) According to an embodiment of the invention, there is provided a workpiece conveyance device including:

a base body disposed adjacent to a press machine;

a pair of first arms whose base ends are rotatably supported relative to the base body:

a pair of second arms whose base ends are rotatably supported at respective tips of the first arms; and a pair of holding portions independent of each other and rotatably supported at respective tips of the second arms, each of the holding portions including a plurality of holding members which holds a workpiece, at least one of the holding portions including:

a first support member which supports the plurality of holding members;

a second support member rotatably supported at the tip of the second arm and supporting the first support member; and an absorption member provided between the first support member and the second support member, the second support member movably supporting the first support member along an intersection direction intersecting with a conveyance direction in which the workpiece is conveyed, and the absorption member allowing movement of the second support member caused in the intersection direction relative to the first support member, and enabling the second support member to return to an initial position in the intersection direction relative to the first support member.

According to the workpiece conveyance device described above, the generation of strain in a workpiece may be reduced even in a case where a single workpiece is conveyed by a pair of holding portions independent of each other.

(2) In the workpiece conveyance device described above, each of the pair of holding portions may include the first support member and the second support member, at least one of the pair of holding portions may include the absorption member, and in a state in which the pair of holding portions holds a single workpiece, while a first distance between one of the first support members and the other one of the first support members is maintained, the absorption member may be able to deform to decrease a second distance between one of the second support members and the other one of the second support members, and the absorption member may be able to deform to increase the decreased second distance while the first distance is maintained.

According to the workpiece conveyance device described above, it is possible to reduce the generation of strain in a workpiece even in a case where a single workpiece is conveyed by a pair of holding portions independent of each other, by making the second distance adjustable while maintaining the first distance.

(3) In the workpiece conveyance device described above, the absorption member may include a first spring and a second spring each made of a compression coil spring compressible between the first support member and the second support member, the first spring may be compressed by the second support member moving to be closer to the other one of the holding portions, and may be restored in such a manner as to move the second support member away from the other one of the holding portions, and the second spring may be compressed by the second support member moving away from the other one of the holding portions, and may be restored in such a manner as to move the second support member to be closer to the other one of the holding portions.

According to the workpiece conveyance device described above, it is possible to reduce the generation of strain in a workpiece even in a case where a single workpiece is conveyed by a pair of holding portions independent of each other, by the compression and restoration of the compression coil springs.

(4) In the workpiece conveyance device described above, the absorption member may include a first cylinder and a second cylinder each made of a pneumatic cylinder compressible between the first support member and the second support member, the first cylinder may be compressed by the second support member moving to be closer to the other one of the holding portions, and may be restored in such a manner as to move the second support member away from the other one of the holding portions, and the second cylinder may be compressed by the second support member moving away from the other one of the holding portions, and may be restored in such a manner as to move the second support member to be closer to the other one of the holding portions.

According to the workpiece conveyance device described above, the generation of strain in a workpiece may be reduced even in a case where a single workpiece is conveyed by a pair of holding portions independent of each other, by the compression and restoration of the pneumatic cylinders.

(5) In the workpiece conveyance device described above, the absorption member may include a first magnet set and a second magnet set each constituted of a set of magnets opposed to each other with same poles and disposed separate from each other between the first support member and the second support member, the first magnet set may move in such a manner as to move the second support member away from the other one of the holding portions with a repulsive force generated when the second support member moves to be closer to the other one of the holding portions, and the second magnet set may move in such a manner as to move the second support member to be closer to the other one of the holding portions with a repulsive force generated when the second support member moves away from the other one of the holding portions.

According to the workpiece conveyance device described above, the generation of strain in a workpiece may be reduced even in a case where a single workpiece is conveyed by a pair of holding portions independent of each other, by adjusting the distance using the repulsive force of the magnet set.

(6) In the workpiece conveyance device described above, the first arm may rotate about a first rotation axis relative to the base body, the second arm may rotate about a second rotation axis relative to the first arm, the second support member may rotate about a third rotation axis relative to the second arm, and the first rotation axis, the second rotation axis and the third rotation axis may be parallel to each other.

According to the workpiece conveyance device described above, it is possible to reduce the generation of strain in a workpiece caused by the inertial force generated in portions such as the first arm and by the backlash in the gears used for rotational operation due to the deceleration.

(7) In the workpiece conveyance device described above, the first support member may include a guide member, and the second support member may include a guided member which is slidably guided by the guide member along the intersection direction.

According to the workpiece conveyance device described above, it is possible to prevent displacement of the second support member generated in the intersection direction from being transmitted to the first support member by guiding the second support member relative to the first support member.

(8) The workpiece conveyance device described above may further include a first elevator drive unit and a second elevator drive unit fixed to the base body, the first elevator drive unit may lift and lower one of the pair of first arms relative to the base body, and the second elevator drive unit may lift and lower the other one of the pair of first arms relative to the base body.

According to the workpiece conveyance device described above, by independently lifting and lowering each of the holding portions with the first elevator drive unit and the second elevator drive unit, it is possible to enhance the degree of freedom in setting the conveyance trajectory of the workpiece.

(9) In the workpiece conveyance device described above, the movement of the second support member caused in the intersection direction relative to the first support member, and the return of the second support member to the initial position may be carried out at a release position where the holding members release workpieces.

According to the workpiece conveyance device described above, it is possible to reduce the generation of strain in a workpiece at the release position where the strain due to the inertial force is most likely to be generated in the workpiece.

(10) According to an embodiment of the invention, there is provided a workpiece conveyance device including:

a base body disposed adjacent to a press machine;

a pair of first arms whose base ends are rotatably supported relative to the base body;

a pair of second arms whose base ends are rotatably supported at respective tips of the first arms; and a pair of holding portions independent of each other and rotatably supported at respective tips of the second arms, in a state in which the pair of holding portions holds one workpiece, at least one of the holding portions being able to move the other one of the holding portions in a direction to be closer to or separate from the one of the holding portions, and to return the other one of the holding portions to an initial position in the direction.

According to the workpiece conveyance device described above, the generation of strain in a workpiece may be reduced even in a case where a single workpiece is conveyed by a pair of holding portions independent of each other.

Embodiments of the invention are described in detail below with reference to the drawings. Note that the following embodiments do not unduly limit the scope of the invention as stated in the claims. In addition, all of the elements described below are not necessarily essential requirements of the invention.

1. Outline of Workpiece Conveyance Device

Figure 2:
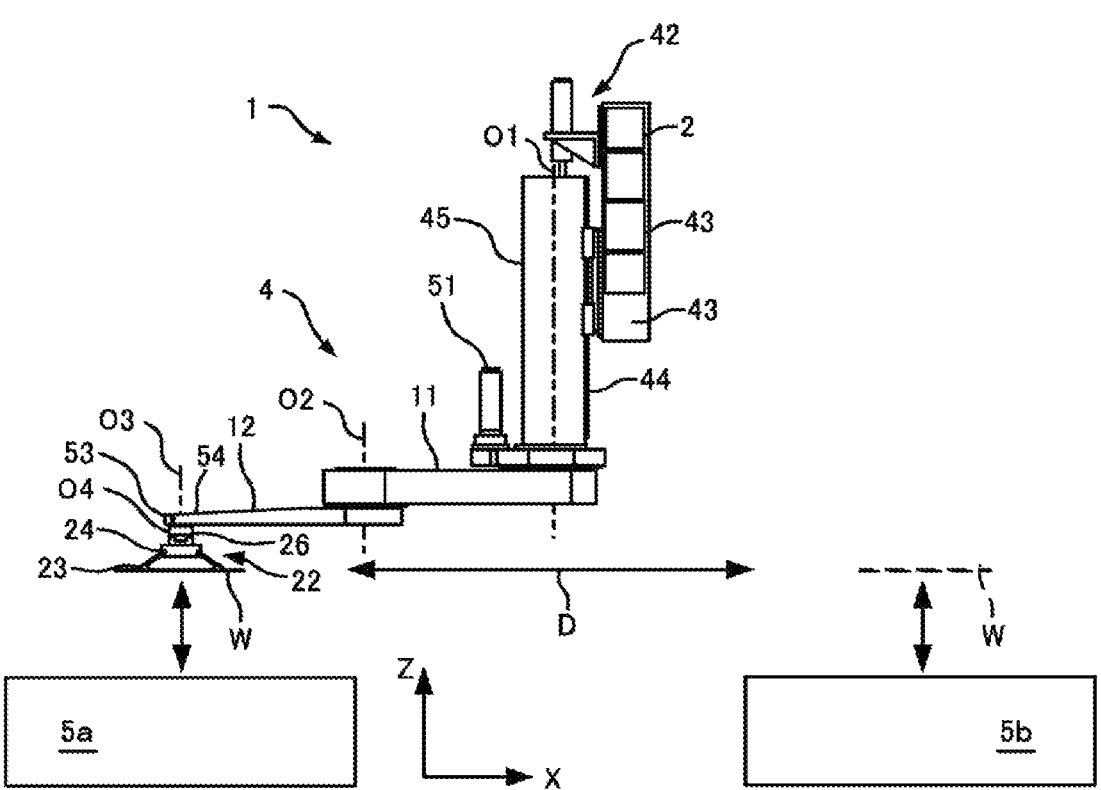
FIG. 2 is a side view of a workpiece conveyance device according to an embodiment of the invention.
Figure 3:
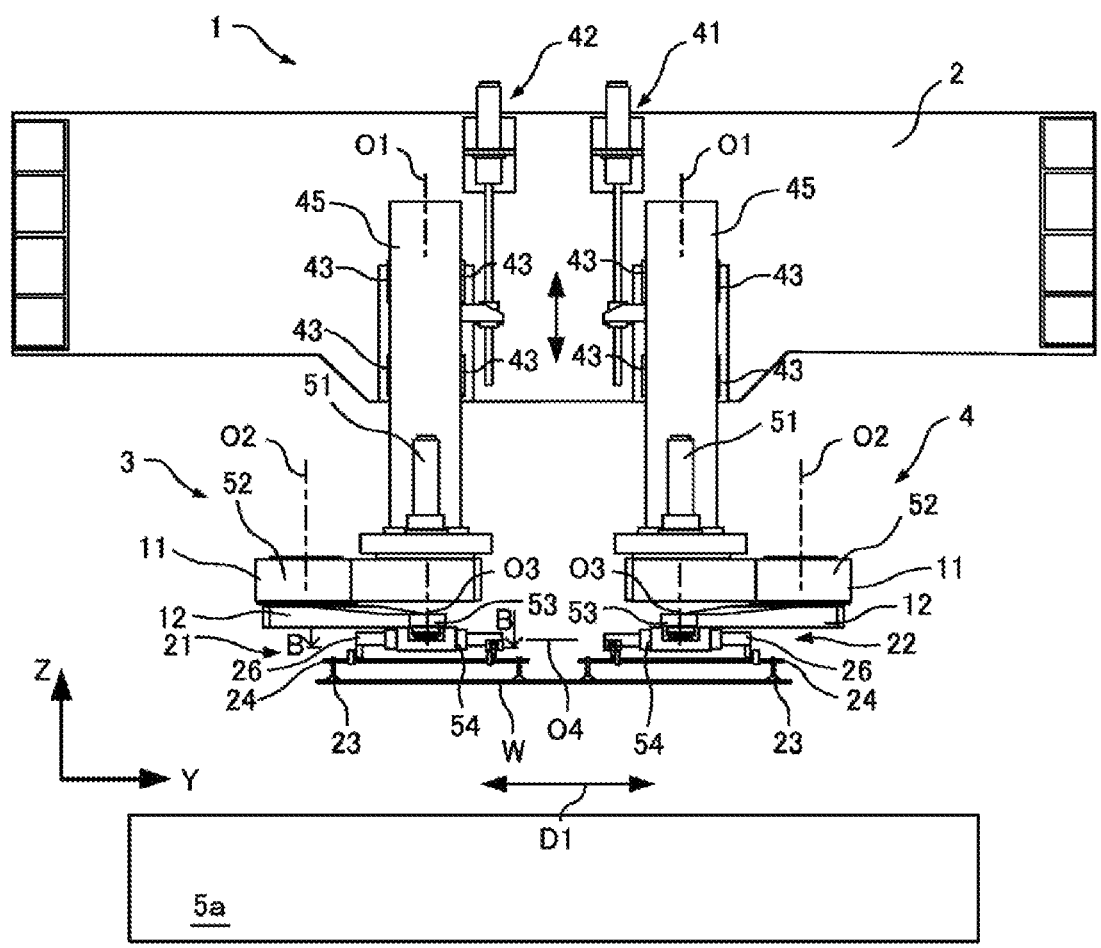
FIG. 3 is a front view of a workpiece conveyance device according to an embodiment of the invention.
Figure 4:
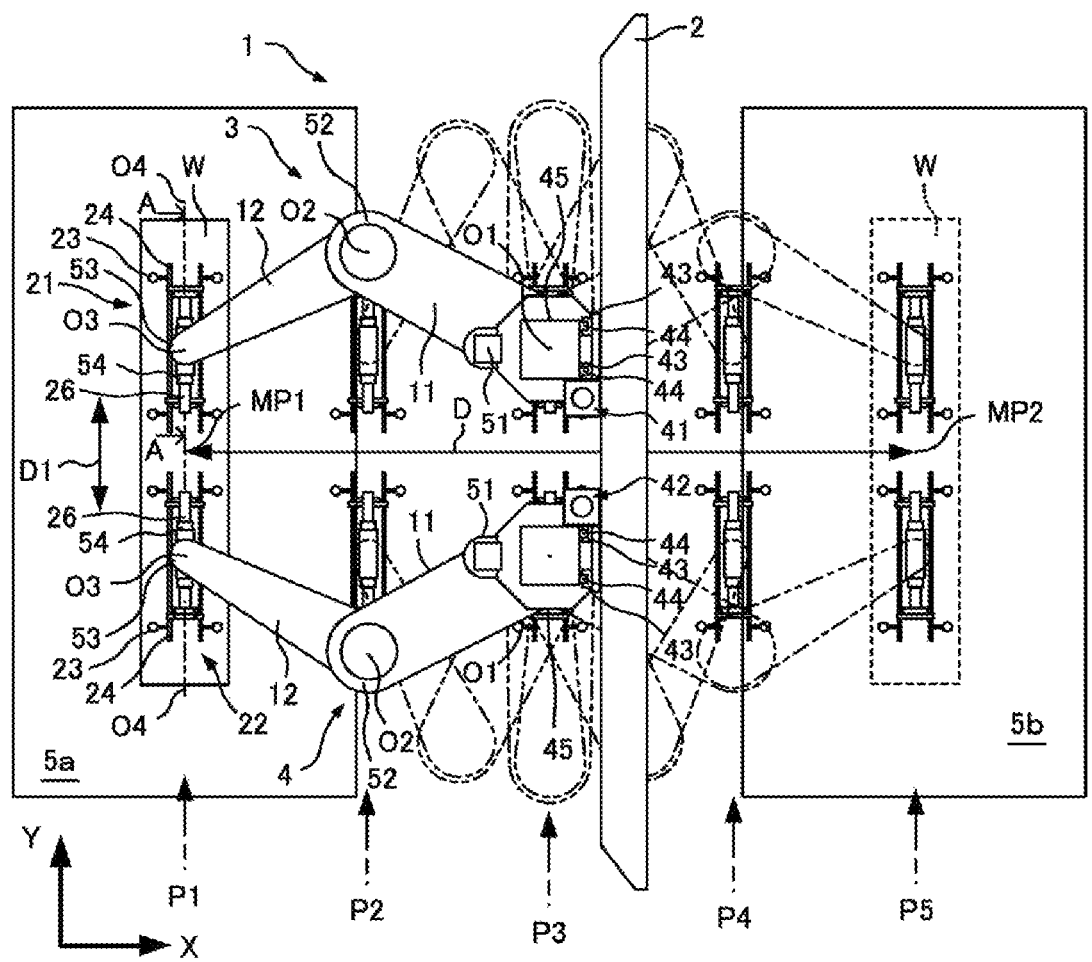
FIG. 4 is a plan view of a workpiece conveyance device according to an embodiment of the invention.

An outline of a workpiece conveyance device 1 according to an embodiment of the invention will be described with reference to FIGS. 1 to 4. FIG. 1 is a perspective view illustrating the entirety of the workpiece conveyance device 1, FIG. 2 is a side view of the workpiece conveyance device 1. FIG. 3 is a front view of the workpiece conveyance device 1, and FIG. 4 is a plan view of the workpiece conveyance device 1.

As illustrated in FIGS. 1 to 4, the workpiece conveyance device 1 loads a workpiece W into a press machine and unloads the workpiece W from the press machine. In the present embodiment, an example in which the workpiece conveyance device 1 is disposed between two press machines is described. However, the workpiece conveyance device 1 may be disposed as a loading device between a material and the press machine in order to load the material before presswork into the press machine, or the workpiece conveyance device 1 may be disposed as a product taking-out device in order to take out the product after presswork. Note that in FIGS. 1 to 4, only a lower die 5a and a lower die 5b of the press machines are illustrated, and the main bodies of the press machines are not illustrated.

The workpiece conveyance device 1 conveys the workpiece W along a conveyance direction D from the lower die 5a on the upstream side toward the lower die 5b on the downstream side. As illustrated in FIG. 4, the conveyance direction D is defined as a direction being set in a horizontal plane at an arbitrary height within a height range where the workpiece W is lifted and lowered by the workpiece conveyance device 1, and also set on a virtual straight line connecting a center position MP1 at a first position P1 at which the workpiece conveyance device 1 receives the workpiece W and a center position MP2 at a fifth position P5 at which the workpiece W is released. The center position is a midpoint between a first holding portion 21 and a second holding portion 22 at the first position P1. The center position MP2 is a midpoint between the first holding portion 21 and the second holding portion 22. Therefore, the conveyance direction D may not indicate an actual conveyance trajectory of the workpiece W.

The workpiece conveyance device 1 includes a base body 2 disposed adjacent to the pressing machines, and a first unit 3 and a second unit 4 as a pair of arm units.

The workpiece conveyance device 1 is provided with a control device 8 configured to control operations of the first unit 3 and the second unit 4. The control device 8 includes, for example, a storage unit configured to store, a control program, a calculation unit configured to receive information from a sensor in each section and perform various calculations based on the control program, and a control unit configured to output a command to each drive unit based on the calculation result. The control device 8 may include a CPU, a RAM, a ROM and the like, and may further include a display device, an input device, or the like.

The base body 2 is disposed adjacent to the lower die 5a of the press machine on the upstream side and adjacent to the lower die 5b of the press machine on the downstream side. The base body 2 is fixed to a leg portion (not illustrated), which is installed upright on the same floor surface as the press machines to be disposed at a predetermined height, for example. The base body 2 may be fixed to the adjacent press machine.

The first unit 3 is provided on a side surface of the base body 2 to be able to move up and down relative to the base body 2 via a first elevator drive unit 41. The second unit 4 is provided on the side surface of the base body 2 to be able to move up and down relative to the base body 2 via the second elevator drive unit 42. The second unit 4 has basically the same structure as the first unit 3, and is in surface symmetry with the first unit 3 with respect to a plane extending in a vertical direction at a center position between the first unit 3 and the second unit 4.

The first unit 3 and the second unit 4 include a pair of first arms 11 and 11, the base ends of which are rotatably supported relative to the base body 2, a pair of second arms 12 and 12, the base ends of Which are rotatably supported at respective tips of the first arms 11 and 11, and a first holding portion 21 and a second holding portion 22 as a pair of holding portions independent of each other and rotatably supported at respective tips of the second arms 12 and 12.

The first holding portion 21 and the second holding portion 22 are independent of each other; that is, because the first holding portion 21 and the second holding portion 22 are not directly coupled, the operation of one of the first unit 3 and the second unit 4 is able to set a conveyance trajectory of the workpiece W without being physically restricted by the operation of the other one thereof.

In a state in which one workpiece W is held by the first holding portion 21 and the second holding portion 22, at least one of the holding portions, for example, the first holding portion 21 is able to move the other one of the holding portions, for example, the second holding portion 22 in a direction to be closer to or separate from the one of the holding portions. Then, the one of the holding portions, for example, the first holding portion 21 is able to return the other one of the holding portions, for example, the second holding portion 22 to an initial position in the direction to be closer to or separate from the one of the holding portions. With such a configuration, according to the workpiece conveyance device 1, the generation of strain in the workpiece W may be reduced even in the case where the single workpiece W is conveyed by the first holding portion 21 and the second holding portion 22 independent of each other.

As illustrated in FIG. 4, the workpiece conveyance device 1 receives the workpiece W from the press machine on the upstream side at the first position P1 on the lower die 5a, and causes the first unit 3 and the second unit 4 to bend outward from each other, thereby releasing the workpiece W to the press machine on the downstream side at the fifth position P5 on the lower die 5b via a second position P2, a third position P3, and a fourth position P4.

1.1. Elevator Drive Unit

As illustrated in FIGS. 1 to 4, the first elevator drive unit 41 and a second elevator drive unit 42 are fixed to the base body 2. The first elevator drive unit 41 lifts and lowers the first arm 11 of the first unit 3 relative to the base body 2, and the second elevator drive unit 42 lifts and lowers the first arm 11 of the second unit 4 relative to the base body 2. Since the basic structures of the first elevator drive unit 41 and the second elevator drive unit 42 are the same, the second elevator drive unit 42 will be described herein.

The second elevator drive unit 42 includes a ball screw mechanism configured to rotate a screw shaft by an electric motor fixed to the base body 2. The screw shaft extending vertically downward relative to the electric motor is screwed with a nut portion having balls. The screw shaft is rotated by the electric motor and the nut portion is linearly moved in an up and down direction along the screw shaft. The nut portion is fixed to a side surface of an elevator body 45. The elevator body 45 is a cylindrical frame having a rectangular cross section extending upward from the base end of the first arm 11. A pair of rails 44 and 44 is provided extending in the vertical direction on the other side surface of the elevator body 45. A guide 43 that is slidably guided to the rail 44 is fixed to the side surface of the base body 2.

When the electric motor of the second elevator drive unit 42 is driven, the screw shaft rotates to move the nut portion in the up and down direction, and the rail 44 of the elevator body 45 slides relative to the guide 43 fixed to the base body 2 so that the elevator body 45 goes up and down relative to the base body 2.

Since the workpiece conveyance device 1 is able to lift and lower each of the holding portions independently by the first elevator drive unit 41 and the second elevator drive unit 42, it is possible to enhance the degree of freedom in setting a conveyance trajectory of the workpiece W. A situation in which it is possible to lift and lower each of the holding portions independently is a situation in which, for example, it is possible for one of the operations of the first elevator drive unit 41 and the second elevator drive unit 42 to set the operation of lifting and lowing without being physically restricted by the other one of the operations thereof.

In the first elevator drive unit 41 and second elevator drive unit 42, other drive mechanisms may be employed as long as the mechanisms lift and lower the elevator body 45 relative to the base body 2; for example, a known linear mechanism such as a rack and pinion or belt drive may be employed.

1.2. Arm Unit

As illustrated in FIGS. 1 to 4, the first unit 3 includes the first arm 11, the second arm 12, and the first holding portion 21. The base end of the first arm 11 is rotatably supported at a lower end of the elevator body 45 of the first elevator drive unit 41 relative to the base body 2. The base end of the second arm 12 is rotatably supported on a lower surface of the tip portion of the first arm 11. The first holding portion 21 is rotatably supported on a lower surface of the tip portion of the second arm 12.

The second unit 4 includes the first arm 11, the second arm 12, and the second holding portion 22. The base end of the first arm 11 is rotatably supported at a lower end of the elevator body 45 of the second elevator drive unit 42 relative to the base body 2. The base end of the second arm 12 is rotatably supported on a lower surface of the tip portion of the first arm 11. The second holding portion 22 is rotatably supported on a lower surface of the tip portion of the second arm 12.

A first motor 51 is fixed to the lower end of the elevator body 45, and the first arm 11 rotates about a first rotation axis O1 relative to the elevator body 45 (base body 2) by the drive of the first motor 51. The first motor 51 is an electric motor. The first rotation axis O1 extends in the vertical direction at the center of the elevator 45. The drive force of the first motor 51 is transmitted to the first arm 11 via a plurality of gears (not illustrated).

A second motor 52 is provided inside the tip portion of the first arm 11, and the drive of the second motor 52 causes the second arm 12 to rotate about a second rotation axis O2 relative to the first arm 11. The second motor 52 is an electric motor. The second rotation axis O2 extends in the vertical direction in a region where the tip of the first arm 11 and the base end of the second arm 12 vertically overlap each other. The drive force of the second motor 52 is transmitted to the second arm 12 via a plurality of gears (not illustrated).

The third motor 53 is provided inside the tip portion of the second arm 12, and the drive of a third motor 53 causes the first holding portion 21 or the second holding portion 22 to rotate about a third rotation axis O3 relative to the second arm 12. The third motor 53 is an electric motor. The third rotation axis O3 extends in the vertical direction in a section where the tip of the second arm 12 and the center of the first holding portion 21 or second holding portion 22 vertically overlap each other. The center of the first holding portion 21 is the center of a width of the first holding portion 21 in the conveyance direction D, and is also the center of a length of the first holding portion 21 in an orthogonal direction D1 orthogonal to the conveyance direction D. The length of the first holding portion 21 in the orthogonal direction D1 is the length of the first holding portion 21 in a plan view of the workpiece conveyance device 1. Similarly to the center of the first holding portion 21, the center of the second holding portion 22 is the center of a width of the second holding portion 22 in the conveyance direction D, and is also the center of a length thereof in the orthogonal direction D1. The drive three of the third motor 53 is transmitted to the first holding portion 21 or the second holding portion 22 via a plurality of gears (not illustrated). The orthogonal direction D1 is assumed to be in a horizontal plane including the conveyance direction D.

The first rotation axis O1, the second rotation axis O2, and the third rotation axis O3 are parallel to one another. By decelerating a conveyance speed of the workpiece W, inertial force generated in the first arm 11, the second arm 12, and the like acts to cause the first holding portion 21 and the second holding portion 22 to approach each other, which produces a force to generate strain in the workpiece W. A plurality of gears are provided in each section of the first unit 3 and the second unit 4 for the rotational operation on each rotation axis; a backlash in these gears at the rotation stop operation acts to cause the first holding portion 21 and the second holding portion 22 to approach each other, which produces a force to generate strain in the workpiece W. As described above, the inertial force and the backlash produce the forces to move the first holding portion 21 and the second holding portion 22 in a direction intersecting with the conveyance direction D (the orthogonal direction D1 according to the direction of each rotation axis in the present embodiment) at a position to which the first unit 3 and the second unit 4 extend, that is, at the fifth position P5 where the workpiece W is released. These forces become forces that cause the first holding portion 21 and the second holding portion 22 to approach each other relative to the second arms 12 having stopped their movements. By providing the mechanism of the first holding portion 21 and/or the second holding portion 22 to be described below, the generation of strain in the workpiece caused by the inertial force and the backlash may be reduced. Note that in the above description, the strain generated in the workpiece W during the period of time in which the conveyance speed of the workpiece W is decelerated and then the workpiece W is stopped, is taken as a problem to be solved. In addition, it is preferable that an aspect of the invention be effective with respect to strain generated in the workpiece W at a time when the conveyance speed of the workpiece W is accelerated from a state of the workpiece W being stopped.

1.3. Holding Portion

Figure 5:
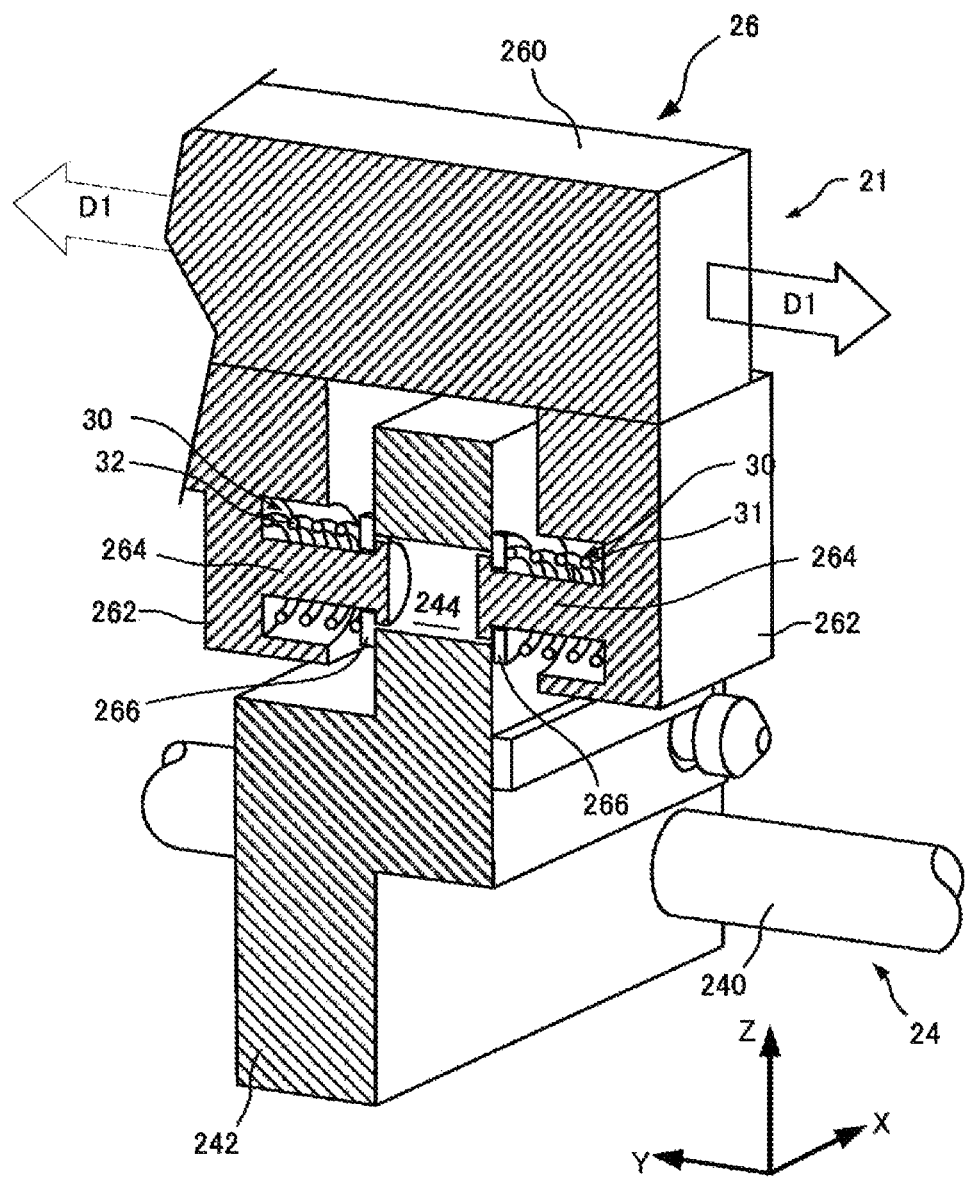
FIG. 5 is an enlarged perspective view of an absorption member of a workpiece conveyance device according to an embodiment of the invention.
Figure 6:
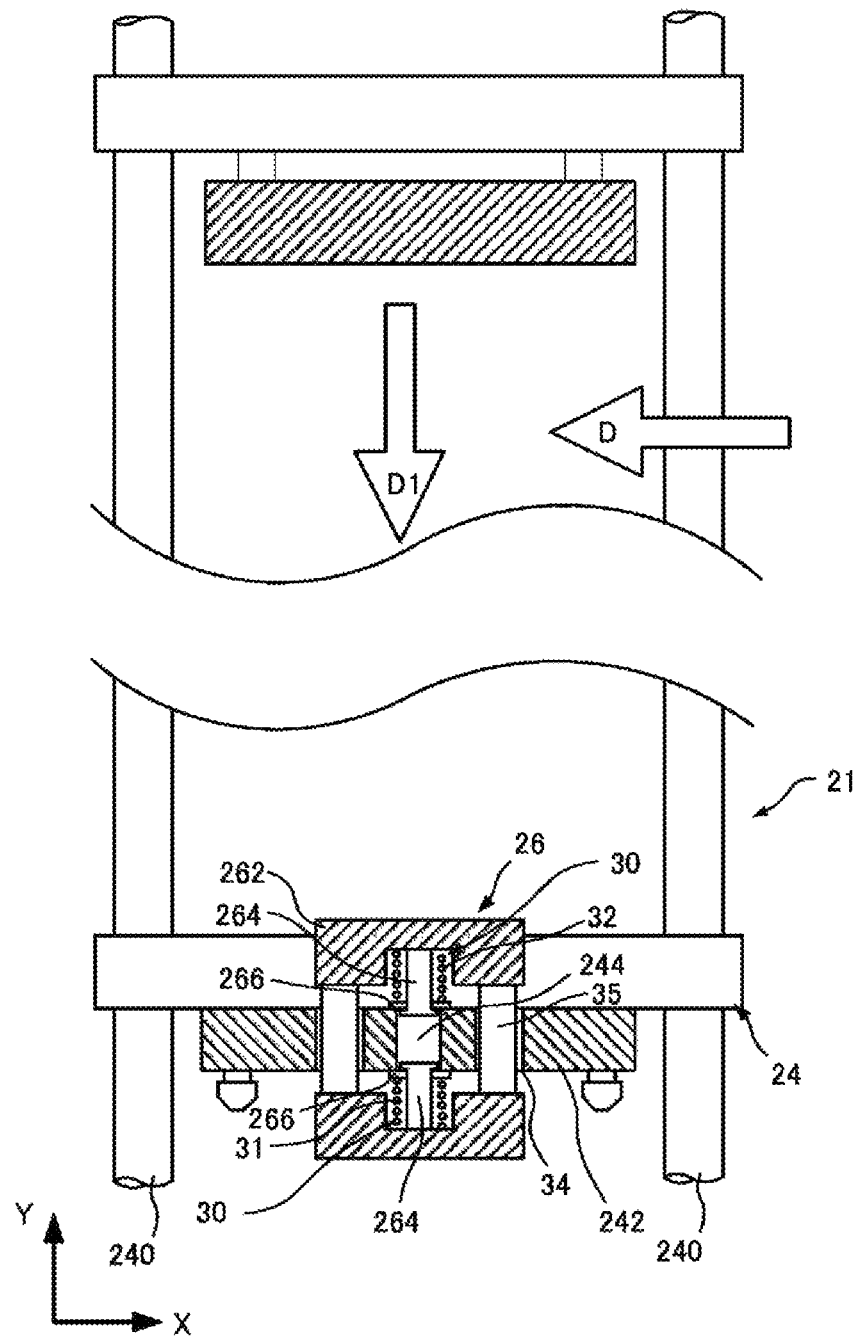
FIG. 6 is a plan view of an absorption member of a workpiece conveyance device according to an embodiment of the invention.

Hereinafter, the first holding portion 21 and the second holding portion 22 as holding portions will be described with reference to FIGS. 1 to 6. FIG. 5 is a cross-sectional view taken along a line A-A in FIG. 4, and is an enlarged perspective view of an absorption member 30 of the workpiece conveyance device 1; FIG. 6 is a cross-sectional view taken along a line B-B in FIG. 3, and is an enlarged plan view of the absorption member 30.

As illustrated in FIGS. 1 to 6, each of the first holding portion 21 and the second holding portion 22 includes a plurality of holding members 23 for holding the workpiece W. In the holding member 23 which is a member for holding the workpiece W, for example, an air suction structure such as a vacuum cup, or a magnetic attachment structure by magnetism may be employed; aside from the suction structure, a clamp mechanism configured to grip the workpiece W, or a hook for hanging the workpiece W, for example may be employed. In the illustrated example, four holding members 23 are provided in each of the holding portions, but the number of holding members 23 is not limited thereto as long as it is possible to stably hold the workpiece W.

At least one of the holding portions, for example, the first holding portion 21 includes a first support member 24 for supporting the plurality of holding members 23, a second support member 26 that is rotatably supported at the tip of the second arm 12 and supports the first support, member 24, and the absorption member 30 provided between the first support member 24 and the second support member 26. The first support member 24 and the second support member 26 are made of metal. The absorption member 30 is illustrated in FIG. 5.

Each of the first holding portion 21 and the second holding portion 22 includes the first support member 24 and the second support member 26, and at least one of the first holding portion 21 and the second holding portion 22 may include the absorption member 30. In the case where at least one of the first holding portion 21 and the second holding portion 22 includes the absorption member 30, the generation of strain in the workpiece W may be reduced even when a distance between the first holding portion 21 and the second holding portion 22 is decreased. As in the present embodiment, both the first holding portion 21 and the second holding portion 22 may include the absorption member 30.

The second support member 26 movably supports the first support member 24 along an intersection direction intersecting with the conveyance direction D in which the workpiece W is conveyed. The intersection direction is the orthogonal direction D1 in the present embodiment. The intersection direction may be a direction other than the orthogonal direction D1 as long as it is possible to reduce the strain with respect to the workpiece W due to the inertial force and the backlash described above. For example, depending on a shape of the workpiece W, it is assumed that a longitudinal direction of the first support member 24 does not coincide with the orthogonal direction D1, but it is sufficient that the strain in the orthogonal direction D1 is reduced by the movement of the first support members 24 along the intersection direction. The second support member 26 movably supports the first support member 24 in the intersection direction, thereby making it possible to reduce the generation of strain in the workpiece W even in a case where the single workpiece W is conveyed by the pair of holding portions.

The first support member 24 includes attachment rods 240 extending along the orthogonal direction D1, and first blocks 242 integrally fixing two attachment rods 240. A through-hole 244 is formed passing through along the orthogonal direction D1 in the first block 242. The two attachment rods 240 are disposed in parallel side by side in the conveyance direction D. Two first blocks 242 are disposed with a distance therebetween in the orthogonal direction D1. The through hole 244 is formed only in one of the two first blocks 242 while being aligned with the arrangement of the absorption member 30.

The second support member 26 includes a crossbar 260 extending along the orthogonal direction D1, and two second blocks 262 that are so fixed as to protrude downward from both ends of the crossbar 260. The crossbar 260 is rotatably supported about a third rotation axis O3 near the center in the orthogonal direction D1, at the tip of the second arm 12. The crossbar 260 is provided with a fourth motor 54, and the crossbar 260 rotates about the fourth rotation axis O4. The drive of the fourth motor 54 tilt-drives the first support member 24 and the holding members 23, whereby the workpiece W may be tilted relative to the second arm 12. The second blocks 262 are so formed as to straddle the first block 242 in the orthogonal direction D1.

The first support member 24 includes a guide member 34. The second support member 26 includes a guided member 35 that is slidably guided by the guide member 34 in the intersection direction, for example, along the orthogonal direction D1. The guided member 35 may be a linear shaft that connects opposed inner surfaces of the second blocks 262 straddling the first block 242, and the guide member 34 may be a linear bushing that passes through the first block 242 in the orthogonal direction D1. When the second support member 26 moves in the orthogonal direction D1, the linear shaft is guided by the linear bushing to allow the movement of the first support member 24 along the intersection direction. By slidably guiding the second support member 26 relative to the first support member 24, displacement of the second support member 26 generated in the intersection direction may be prevented from being transmitted to the first support member 24 and the workpiece W.

In the guide member 34 and the guided member 35, other known direct-driven mechanisms may be employed as long as it is possible to guide the second support member 26 in the intersection direction, for example, along the orthogonal direction D1; for example, a linear guide may be employed.

1.3.1. Absorption Member

Figure 7:
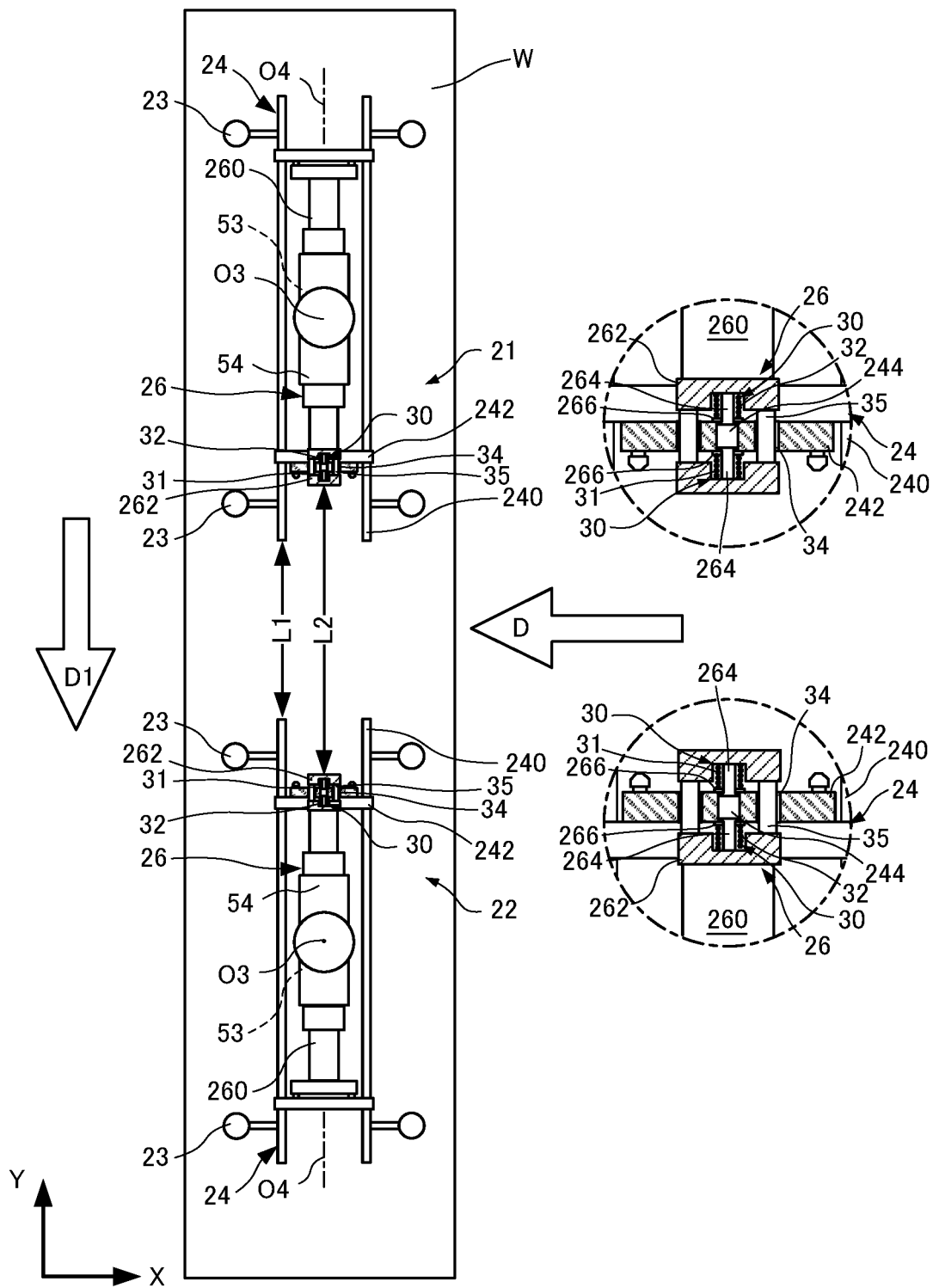
FIG. 7 is a plan view describing operations of an absorption member according to an embodiment of the invention.
Figure 8:
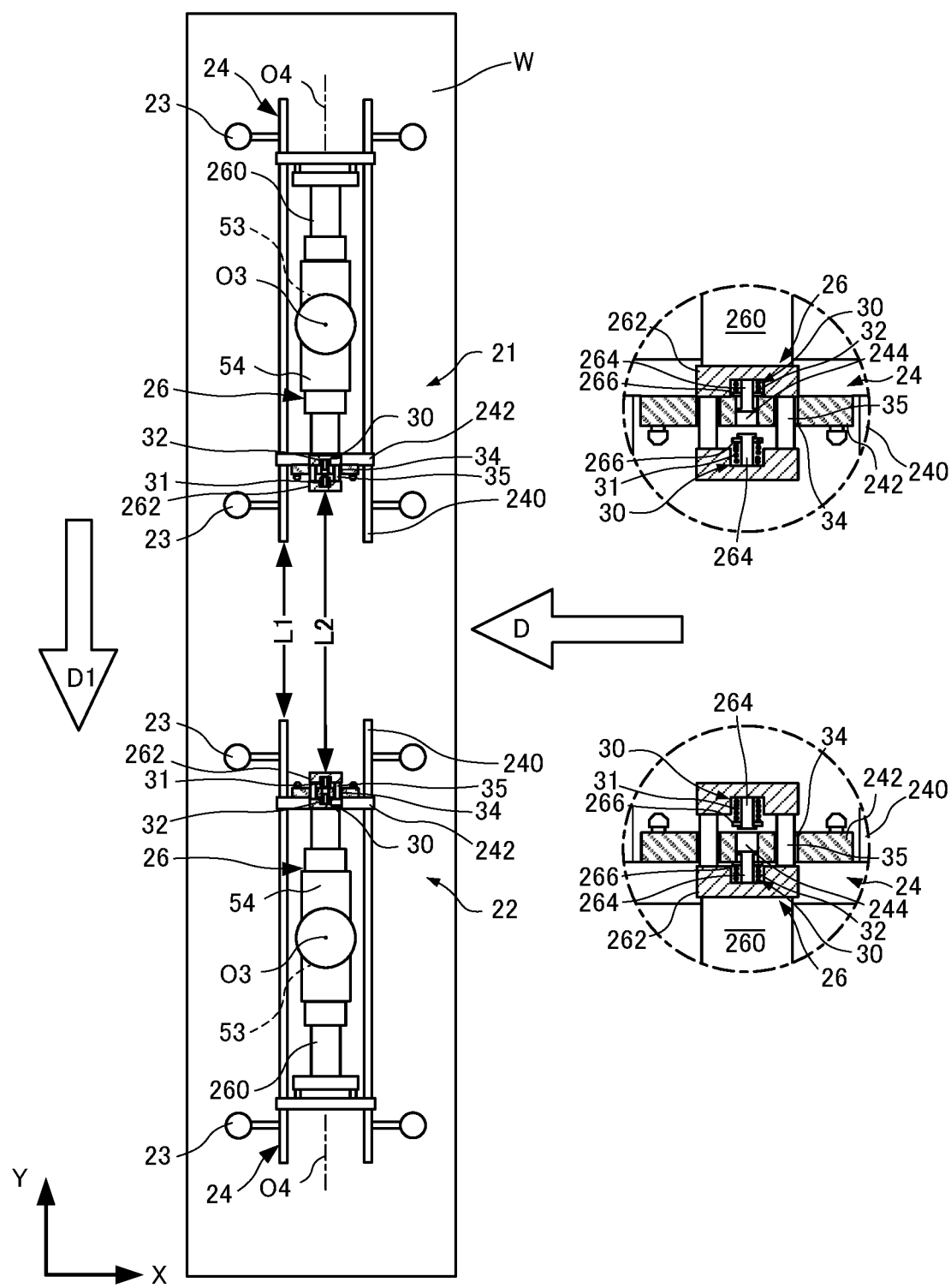
FIG. 8 is a plan view describing operations of an absorption member according to an of embodiment of the invention.
Figure 9:
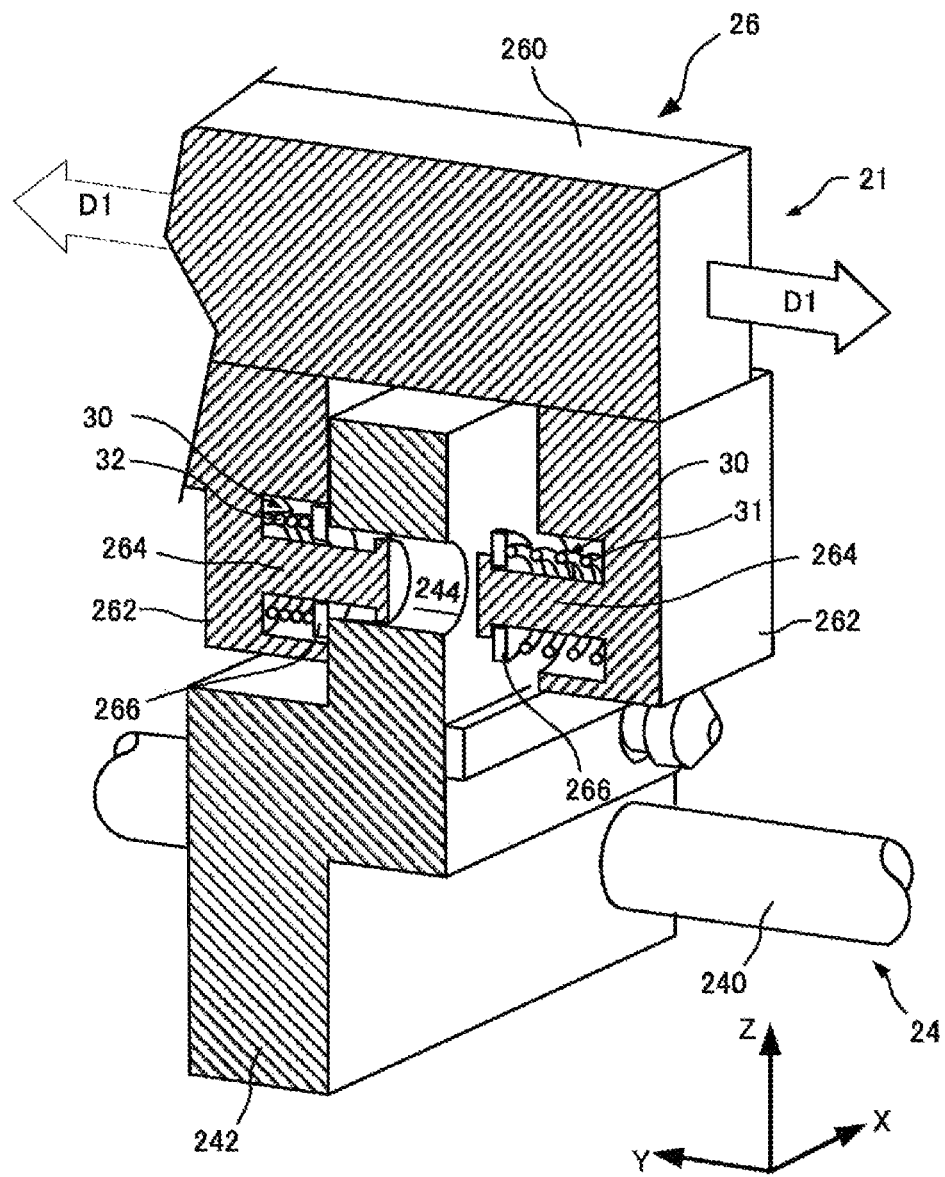
FIG. 9 is an enlarged perspective view of an absorption member of a workpiece conveyance device according to an embodiment of the invention.

Referring to FIGS. 5 to 9, the absorption member 30 will be described in detail. FIGS. 7 and 8 are plan views for explaining operations of the absorption member 30, and FIG. 9 is an enlarged perspective view of the absorption member 30 of the workpiece conveyance device 1 according to the present embodiment. In FIGS. 7 and 8, a state of each absorption member 30 of the first holding portion 21 and the second holding portion 22 is illustrated enlarged in a dot-dash line circle.

As illustrated in FIGS. 5 to 9, the absorption member 30 may allow the movement of the second support member 26 caused in the intersection direction, for example, in the orthogonal direction D1 relative to the first support member 24, and may return the second support member 26 to an initial position in the intersection direction relative to the first support member 24. The initial position is a position before the second support member 26 moves in the intersection direction relative to the first support member 24. In addition, the initial position is a neutral position where there is substantially no load on the absorption member 30. In order to move the first support member 24 with respect to a slight shift of the first support member 24 at the initial position, for example, a slight load may be given to the absorption member 30 at the initial position.

The movement of the second support member 26 caused in the intersection direction relative to the first support member 24 and the return thereof to the initial position may be carried out at the fifth position P5 (FIG. 4), which is a release position where the holding members 23 release the workpiece W. Since the second support member 26 is able to move to be closer to the first support member 24 without affecting the workpiece W even in a state in which the holding members 23 hold the workpiece W, it is possible to reduce the generation of strain in the workpiece W at the release position where the strain due to the inertial force and the backlash is most likely to be generated in the workpiece W. When the holding members 23 release the workpiece W at the release position, the absorption member 30 returns the first support member 24 and the second support member 26 to their initial positions. When the first support member 24 and the second support member 26 are each located in the initial position, the holding members 23 are able to make contact with a desired portion of the workpiece W to be conveyed next.

As illustrated in FIGS. 7 and 8, in a state in which the single workpiece W is being held by the first holding portion 21 and the second holding portion 22, the absorption member 3C) is deformable to decrease a second distance L2 while maintaining a first distance L1, and the absorption member 30 is also deformable to increase the decreased second distance L2 while maintaining the first distance L1. The first distance L1 is a distance between the first support member 24 of the first holding portion 21 and the first support member 24 of the second holding portion 22, and the second distance L2 is a distance between the second support member 26 of the first holding portion 21 and the second support member 26 of the second holding portion 22. It is needless to say that the definitions of the first distance L1 and the second distance L2 are assumed to be made in an initial state where neither the first holding portion 21 nor the second holding portion 22 is rotated about the third rotation axis O3. The deformation of the absorption member 30 refers to a situation in which the overall length of the absorption member 30 varies in the intersection direction; examples of the deformation include deformation in which a piston rod is pushed into a cylinder in a case of a cylinder of Modification Example 1 and deformation in which a distance between magnets is decreased in a case of a set of magnets of Modification Example 2 to be discussed later. By making it possible to adjust the second distance L2 while maintaining the first distance L1, the generation of strain in the workpiece W may be reduced even when the single workpiece W is conveyed by the pair of holding portions independent of each other.

The absorption member 30 includes a first spring 31 and a second spring 32 each constituted of a compression coil spring that is compressible between the first support member 24 and the second support member 26. The first spring 31 is provided opposed to the second spring 32 with the first block 242 interposed therebetween in the orthogonal direction D1. The first spring 31 is compressed by the second support member 26 moving to be closer to the second holding portion 22 as the other one of the holding portions, and is restored in such a manner as to move the second support member 26 away from the second holding portion 22. The second spring 32 is compressed by the second support member 26 moving away from the second holding portion 22, and is able to be restored in such a manner as to move the second support member 26 to be closer to the second holding portion 22. By compressing and restoring the compression coil springs, the generation of strain in the workpiece W may be reduced even in the case where the single workpiece W is conveyed by the pair of holding portions independent of each other.

The first spring 31 is disposed to be wound around a flanged collar 264 extending from the inner surface of the second block 262 toward the first block 242 along the orthogonal direction D1. At a free end of a columnar body of the flanged collar 264, integrally provided is a flange having an outer diameter larger than that of the columnar body portion. One end of the first spring 31 makes contact with the inner surface of the second block 262 and the other end thereof makes contact with a washer 266 pressed against the flange at the tip of the flanged collar 264. The second spring 32 is similarly attached around the flanged collar 264.

As illustrated in FIGS. 5 and 6, it is possible to insert the flange of the flanged collar 264 through the through-hole 244 of the first block 242, but it is impossible to insert the washer 266 therethrough. Due to this, when the second support member 26 of the first holding portion 21 moves, from a state in which the second support member 26 is at the initial position in FIG. 7, toward the second holding portion 22 (in the downward direction in FIG. 8) as illustrated in FIG. 8, the flanged collar 264 takes a state as illustrated enlarged in FIG. 9. As illustrated in FIG. 9, the second spring 32 is pressed against the washer 266 and compressed as the second block 262 moves, and the flanged collar 264 on which the second spring 32 is attached enters into the through-hole 244. Due to this, when the holding members 23 release the workpiece W, a restoring force by which the second spring 32 tries to return to its original length acts between the washer 266 and the second block 262, thereby moving the second support member 26 away from the second holding portion 22. The second support member 26 gradually returns to its initial position because the first spring 31 is present on the opposite side. Note that the attachment structure of the first spring 31 and the second spring 32 is not limited thereto.

2. Modification Example 1

Figure 10:
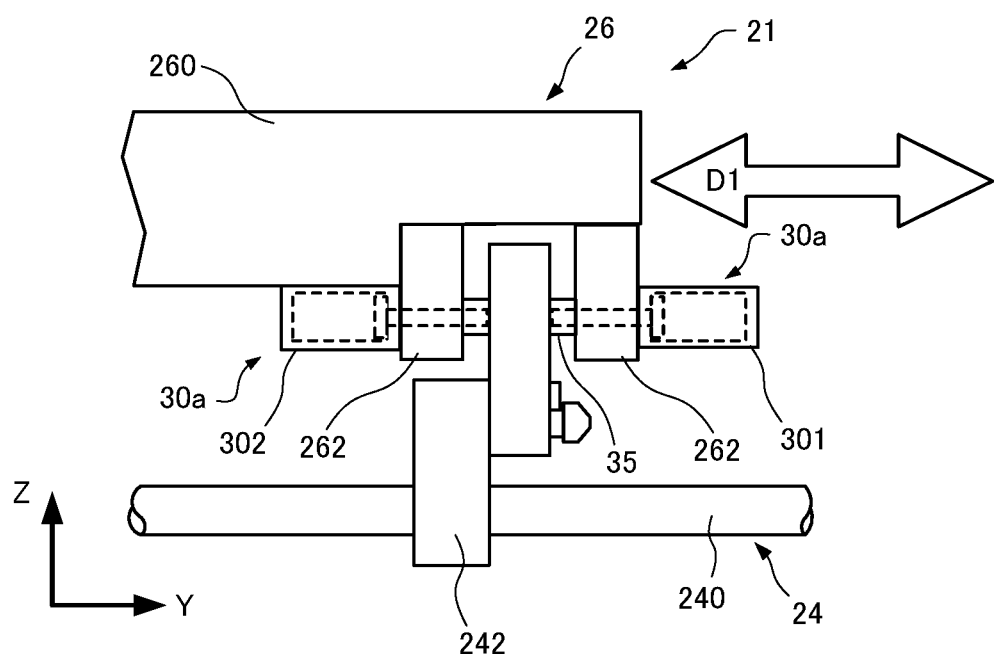
FIG. 10 is a front view of an absorption member of a workpiece conveyance device according to Modification Example 1.
Figure 11:
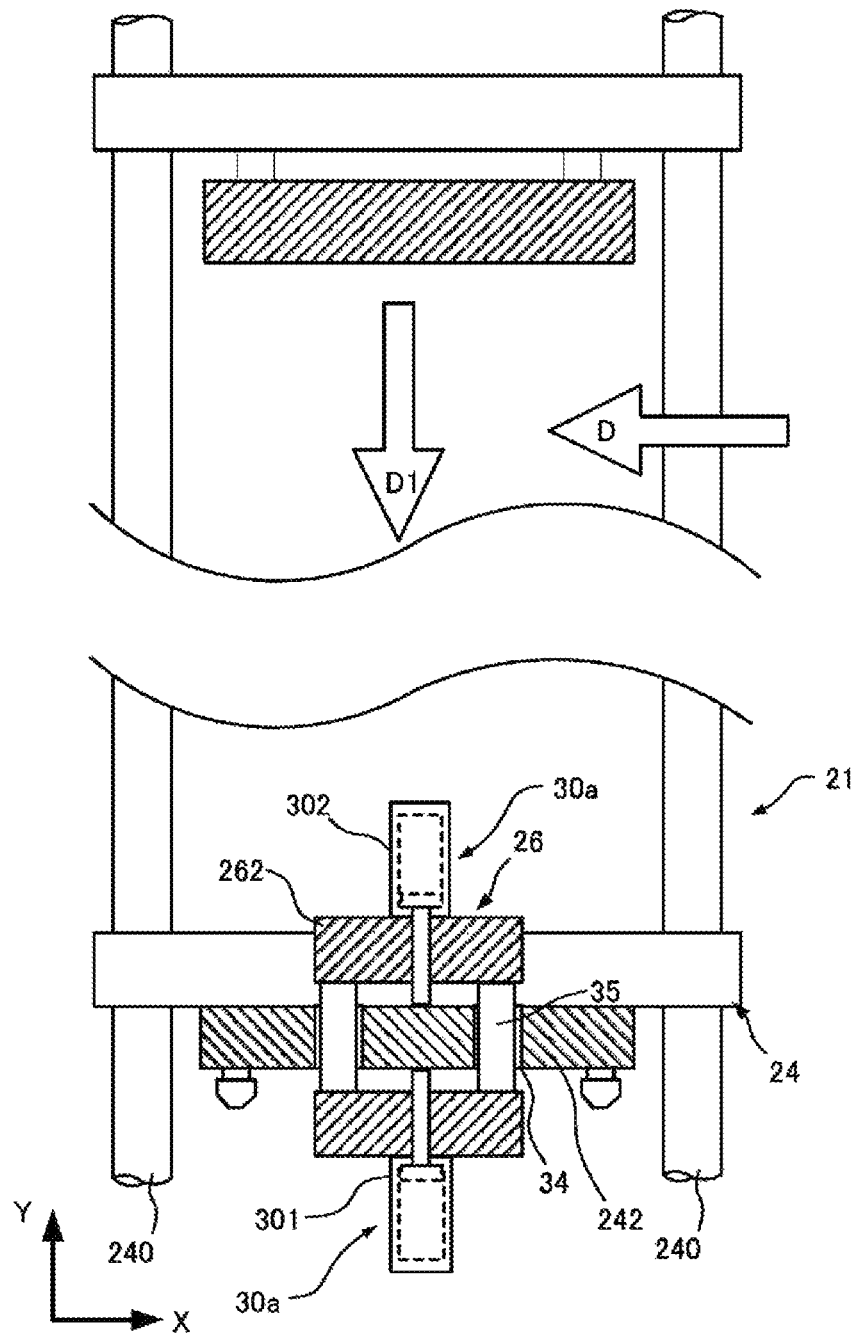
FIG. 11 is a plan view of an absorption member of a workpiece conveyance device according to Modification Example 1.

Modification Example 1 of the workpiece conveyance device 1 will be described with reference to FIGS. 10 and 11. FIG. 10 is a front view of an absorption member 30a of a first holding portion 21 of a workpiece conveyance device 1 according to Modification Example 1, and FIG. 11 is a plan view of the absorption member 30a of the first holding portion 21 of the workpiece conveyance device 1 according to Modification Example 1. The workpiece conveyance device 1 in FIGS. 10 and 11 is basically the same as the workpiece conveyance device 1 according to the above-described embodiment except for the configuration of the absorption member 30a. Therefore, the same components as those in the above-described embodiment will be described using the same reference signs, and redundant descriptions thereof will be omitted.

As illustrated in FIGS. 10 and 11, the absorption member 30a of the first holding portion 21 includes a first cylinder 301 and a second cylinder 302 each constituted of a pneumatic cylinder compressible between a first support member 24 and a second support, member 26. The expression "compressible between the first support member 24 and the second support member 26" refers to a state of being compressible by relative movement between the first support member 24 and the second support member 26. Accordingly, it is sufficient that the first cylinder 301 or the second cylinder 302 is compressed due to a change in distance along an orthogonal direction D1 between the first support member 24 and the second support member 26 as in FIGS. 10 and 11, or arrangement in which a pneumatic cylinder is interposed between the first support member 24 and the second support member 26 may be employed. FIGS. 10 and 11 illustrate a state in which the second support member 26 is at an initial position relative to the first support member 24.

As for the first cylinder 301 and the second cylinder 302, each cylinder tube thereof is fixed to a second block 262 in such a manner that each piston rod thereof passes through the second block 262. The through-hole 244 as illustrated in FIG. 6 is not formed in a first block 242, the tip of the piston rod of the first cylinder 301 makes contact with a side surface of the first block 242, and the tip of the piston rod of the second cylinder 302 makes contact with a side surface on the opposite side of the first block 242. Compressed air is fed into the interior of the first cylinder 301 and the second cylinder 302, and each piston rod thereof is biased all the time against the first block 242 side.

The first cylinder 301 is compressed by the second support member 26 moving to be closer to a second holding portion 22 as the other one of the holding portions, and is restored in such a manner as to move the second support member 26 away from the second holding portion 22. The second cylinder 302 is compressed by the second support member 26 moving away from the second holding portion 22, and is restored in such a manner as to move the second support member 26 to be closer to the second holding portion 22. By compressing and restoring the pneumatic cylinders, the generation of strain in the workpiece W may be reduced even in the case where the single workpiece W is conveyed by the pair of holding portions independent of each other.

Although the absorption member 30a of the first holding portion 21 is described, the same absorption member 30a may also be provided in the second holding portion 22.

Furthermore, the supply and discharge of the compressed air to and from the first cylinder 301 and the second cylinder 302 may be controlled during the conveyance of the workpiece W. For example, when the holding members 23 receive the workpiece W at the first position P1 in FIG. 4, the piston of each of the first cylinder 301 and the second cylinder 302 is advanced to maintain the initial position; thereafter, when the holding members 23 suck the workpiece W, the compressed air to the piston of each of the first cylinder 301 and the second cylinder 302 is degassed, or the piston is retracted to allow the movement of the second block 262 relative to the first block 242; furthermore, when the holding members 23 release the workpiece W at the fifth position P5, the piston of each of the first cylinder 301 and the second cylinder 302 may be so controlled as to advance to return to the initial position.

3. Modification Example 2

Figure 12:
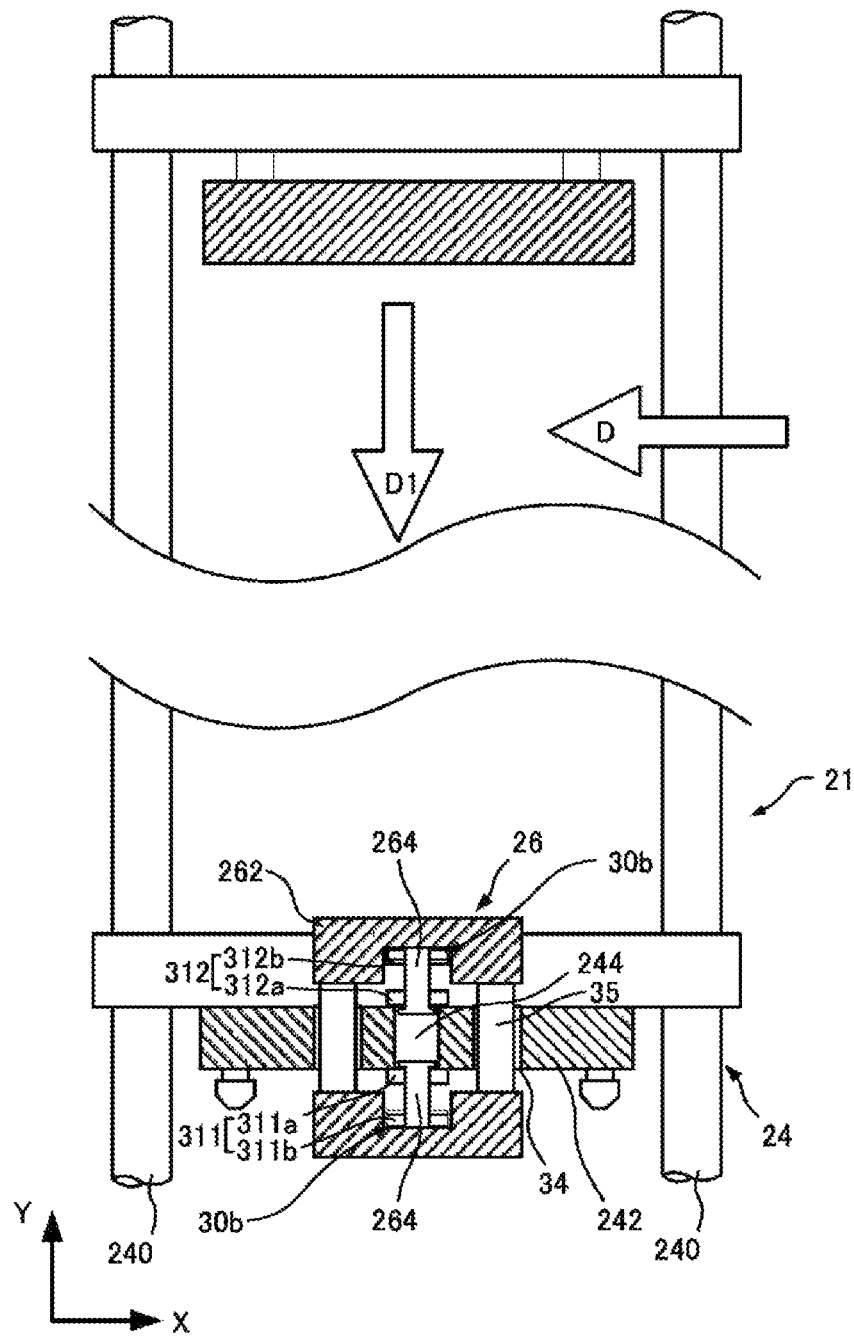
FIG. 12 is a plan view of an absorption member of a workpiece conveyance device according to Modification Example 2.

Modification Example 2 of a workpiece conveyance device 1 will be described with reference to FIG. 12. FIG. 12 is a plan view of an absorption member 30b of a first holding portion 21 of the workpiece conveyance device 1 according to Modification Example 2. The workpiece conveyance device 1 in FIG. 12 is basically the same as the workpiece conveyance device 1 according to the above-described embodiment except for the configuration of the absorption member 30b. Therefore, the same components as those in the above-described embodiment Till be described using the same reference signs, and redundant descriptions thereof will be omitted.

As illustrated in FIG. 12, the absorption member 30b of the first holding portion 21 includes a first magnet set 311 and a second magnet set 312 constituted of a set of magnets disposed separate from each other between a first support member 24 and a second support member 26 in which the same poles oppose each other. The first magnet set 311 is constituted of a magnet 311a and a magnet 311b disposed separate from each other, and the magnets 311a and 311b are so disposed that the same poles face each other. The second magnet set 312 is constituted of a magnet 312a and a magnet 312b disposed separate from each other, and the magnets 312a and 312b are so disposed that the same poles face each other.

The first magnet set 311 moves such that the second support member 26 is moved away from the other one of the holding portions by a repulsive force generated when the second support member 26 moves to be closer to the second holding portion 22 as the other one of the holding portions. The second magnet set 312 is able to move such that the second support member 26 is moved to be closer to the other one of the holding portions by a repulsive force generated when the second support member 26 moves away from the second holding portion 22 as the other one of the holding portions. The generation of strain in a workpiece W may be reduced even in a case where a single workpiece W is conveyed by the pair of holding portions independent of each other, by adjusting the distance using the repulsive force of the magnet set.

Although the absorption member 30b of the first holding portion 21 is described, the same absorption member 30b may also be provided in the second holding portion 22.

4. Modification Example 3

Figure 13:
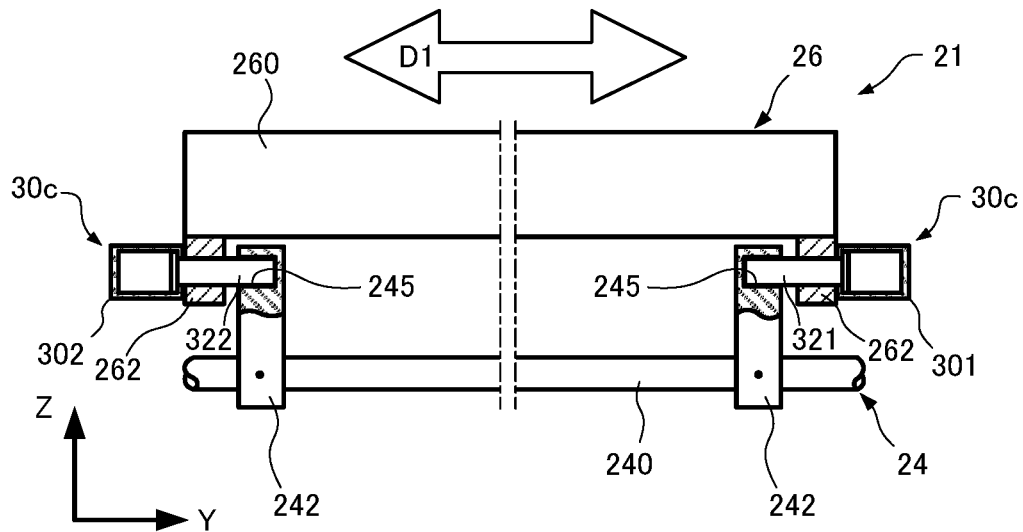
FIG. 13 is a front view of a first holding portion of a workpiece conveyance device according to Modification Example 3.
Figure 14:
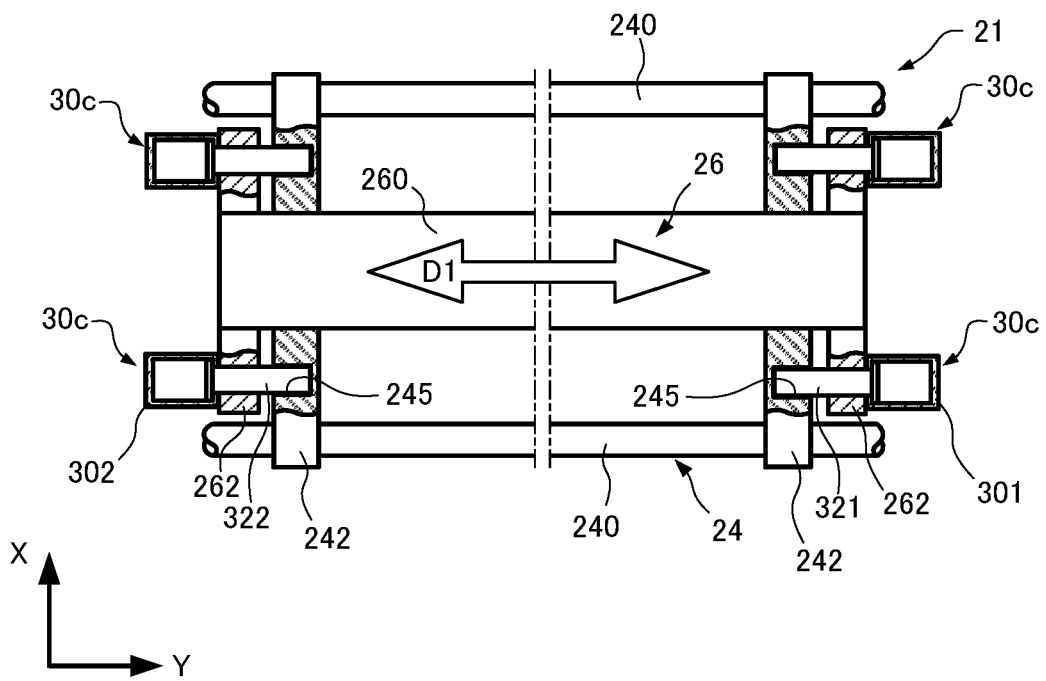
FIG. 14 is a plan view of a first holding portion of a workpiece conveyance device according to Modification Example 3.
Figure 15:
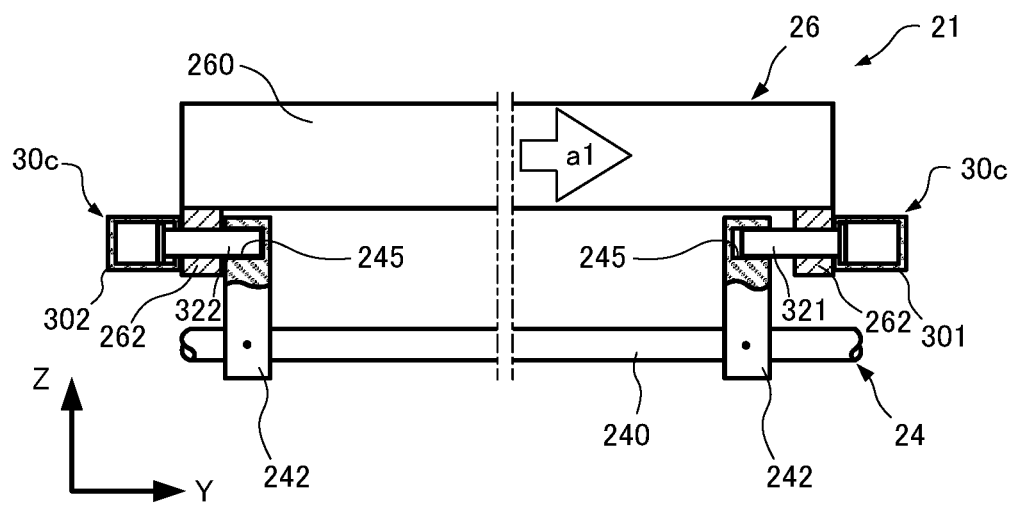
FIG. 15 is a front view describing operations of an absorption member according to Modification Example 3.
Figure 16:
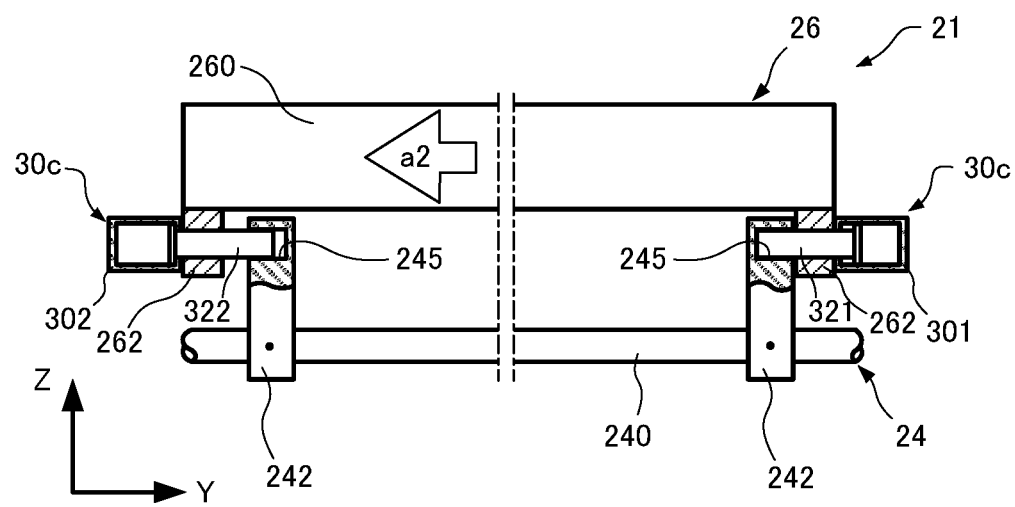
FIG. 16 is a front view describing operations of an absorption member according to Modification Example 3.

Referring to FIGS. 13 to 16, Modification Example 3 of a workpiece conveyance device 1 will be described below. FIG. 13 is a front view of a first holding portion 21 of the workpiece conveyance device 1 according to Modification Example 3, FIG. 14 is a plan view of the first holding portion 21 of the workpiece conveyance device 1 according to Modification Example 3, FIG. 15 is a diagram describing operations of an absorption member 30c according to Modification Example 3, and FIG. 16 is also a diagram describing the operations of the absorption member 30c according to Modification Example 3, In FIGS. 13 to 16, parts of a first block 242 and a second block 262 and a cross-section of each of cylinder tubes of a first cylinder 301 and a second cylinder 302 are indicated by hatching. The workpiece conveyance device 1 in FIGS. 13 to 16 will be described using the same reference signs for the same components as those of the workpiece conveyance device 1 according to the above-described embodiment, and redundant description thereof will be omitted. A second holding portion 22 (not illustrated) does not include the absorption member 30c, and a first support member 24 and a second support member 26 are integrally provided.

As illustrated in FIGS. 13 and 14, the absorption member 30a of the first holding portion 21 includes the first cylinder 301 and the second cylinder 302 each constituted of a pneumatic cylinder compressible between the first support member 24 and the second support member 26. Similarly to Modification Example 1 described above, the expression "compressible between the first support member 24 and the second support member 26" refers to a state of being compressible by relative movement between the first support member 24 and the second support member 26. FIGS. 13 and 14 illustrate a state in which the second support member 26 is at an initial position relative to the first support member 24.

Two second blocks 262 are fixed to a crossbar 260 extending along an orthogonal direction D1 in such a manner as to protrude downward from both ends of the crossbar 260. Further, the second block 262 extends toward both sides of the crossbar 260 in a direction along the X-axis, as illustrated in FIG. 14.

Cylinder tubes of the first cylinder 301 and the second cylinder 302 are fixed to an outer surface of the two second blocks 262 respectively in such a manner that piston rods 321 and 322 of the respective cylinders face each other. As a result, as illustrated in FIG. 14, two first cylinders 301 are fixed to the second block 262 on the right side with a distance therebetween in a direction along the X-axis. Further, as illustrated in FIG. 14, two second cylinders 302 are fixed to the second block 262 on the left side with a distance therebetween in the direction along the X-axis.

Each of two first blocks 242 includes two guide holes 245 at the positions corresponding to the piston rods 321 and 322 of the first cylinder 301 and the second cylinder 302, respectively. The guide hole 245 extends along the orthogonal direction D1. The guide hole 245 does not pass through the first block 242 and has a bottom.

The piston rod 321 of the first cylinder 301 and the piston rod 322 of the second cylinder 302 respectively pass through the second block 262 and extend into the guide hole 245 of the first block 242. The tip of each of the piston rods 321 and 322 makes contact with the bottom of the guide hole 245 at the initial position. Each of the piston rods 321 and 322 is slidably guided in the guide hole 245 and is movable relative to the first block 242 along the orthogonal direction D1.

Compressed air is fed from a pneumatic circuit (not illustrated) into the interior of each cylinder tube of the first cylinder 301 and the second cylinder 302, and the compressed air biases the pistons all the time in a direction in which the piston rods 321 and 322 push the first block 242. By the piston rods 321 and 322 pushing the first block 242, the first block 242 and the second block 262 have a predetermined distance therebetween along the orthogonal direction D1 at the initial position. Accordingly, the first block 242 is movable relative to the second block 262 by the distance against the pushing force of the piston rod 321 or the piston rod 322.

FIG. 15 illustrates a state in which the second support member 26 moves toward the right side of FIG. 15 (arrow a1), that is, a state in which the second support member 26 moves to be closer to a second holding portion 22 (not illustrated), which is the other one of the holding portions. The tip of the piston rod 321 of the first cylinder 301 is separated from the bottom of the guide hole 245, and the distance between the first block 242 and the second block 262 on the left side of FIG. 15 becomes shorter than that at the time of the initial state. At this time, the piston rod 322 of the second cylinder 302 retracts inside the second cylinder 302. Thereafter, the second cylinder 302 moves the second block 262 to the left by the compressed air in the second cylinder 302, and causes the second support member 26 to return to the initial position.

FIG. 16 illustrates a state in which the second support member 26 moves toward the left side of FIG. 16 (arrow a2), that is, a state in which the second support member 26 moves away from the second holding portion 22 (not illustrated), which is the other one of the holding portions. The tip of the piston rod 322 of the second cylinder 302 is separated from the bottom of the guide hole 245, and the distance between the first block 242 and the second block 262 on the right side of FIG. 16 becomes shorter than that at the time of the initial state. At this time, the piston rod 321 of the first cylinder 301 retracts inside the first cylinder 301. Thereafter, the first cylinder 301 moves the second block 262 to the right by the compressed air in the first cylinder 301, and causes the second support member 26 to return to the initial position.

In the states illustrated in FIGS. 15 and 16, the distance between the first support member 24 of the first holding portion 21 and the first support member 24 of the second holding portion 22 (not illustrated) is kept constant, and no strain is generated in the workpiece W held by these first support members 24. As discussed above, by the compressing and restoring of two pneumatic cylinders, the generation of strain in the workpiece W may be reduced even in the case where the single workpiece W is conveyed by the pair of holding portions independent of each other.

In Modification Example 3, the absorption member 30c is provided only in the first holding portion 21, but the same absorption member 30c may also be provided in the second holding portion 22. The absorption member 30c is biased all the time in the direction in which each piston rod pushes the first block 242, but the bias force of each piston rod may be adjusted by controlling the supply and discharge of compressed air to and from the first cylinder 301 and the second cylinder 302 during the conveyance of the workpiece W.

The invention is not limited to the above-described embodiments, and various kinds of modifications may be made. The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A workpiece conveyance device comprising:
   a base body disposed adjacent to a press machine;
   a pair of first arms whose base ends are rotatably supported relative to the base body;
   a pair of second arms whose base ends are rotatably supported at respective tips of the first arms;
   a first holding portion rotatably supported at a tip of one of the second arms; and
   a second holding portion that is independent of the first holding portion and rotabably supported at a tip of another one of the second arms,
   wherein each of the first and second holding portions includes a plurality of holding members which holds a workpiece,
   wherein the first holding portion includes:
      a first support member which supports the plurality of holding members;
      a second support member rotatably supported at the tip of one second arm and supporting the first support member; and
      an absorption member provided between the first support member and the second support member,
   wherein the second support member movably supports the first support member along an intersection direction intersecting with a conveyance direction in which the workpiece is conveyed,
   wherein the absorption member allows the second support member to move in the intersection direction relative to the first support member, and returns the second support member to an initial position in the intersection direction relative to the first support member,
   wherein the absorption member includes a first spring and a second spring each made of a compression coil spring compressible between the first support member and the second support member,
   wherein the first spring is compressed by the second support member moving to be closer to the other one of the first and second holding portions, and is restored in such a manner as to move the second support member away from the other one of the first and second holding portions, and
   wherein the second spring is compressed by the second support member moving away from the other one of the first and second holding portions, and is restored in such a manner as to move the second support member to be closer to the other one of the first and second holding portions.

2. The workpiece conveyance device according to claim 1,
   wherein each of the first and second holding portions includes the first support member and the second support member,
   wherein at least one of the first and second holding portions includes the absorption member, and
   wherein, in a state in which the first and second holding portions holds a single workpiece, while a first distance between one of the first support members and the other one of the first support members is maintained, the absorption member is able to deform to decrease a second distance between one of the second support members and the other one of the second support members, and the absorption member is able to deform to increase the decreased second distance while the first distance is maintained.

3. The workpiece conveyance device according to claim 1,
   wherein the first arm rotates about a first rotation axis relative to the base body,
   wherein the second arm rotates about a second rotation axis relative to the first arm,
   wherein the second support member rotates about a third rotation axis relative to the second arm, and
   wherein the first rotation axis, the second rotation axis, and the third rotation axis are parallel to each other.

4. The workpiece conveyance device according to claim 1,
   wherein the first support member includes a guide member, and
   wherein the second support member includes a guided member which is slidably guided by the guide member along the intersection direction.

5. The workpiece conveyance device according to claim 1, further comprising a first elevator drive unit and a second elevator drive unit fixed to the base body,
   wherein the first elevator drive unit lifts and lowers one of the pair of first arms relative to the base body, and
   wherein the second elevator drive unit lifts and lowers the other one of the pair of first arms relative to the base body.

6. The workpiece conveyance device according to claim 1, wherein the movement of the second support member is caused in the intersection direction relative to the first support member, and the return of the second support member to the initial position are carried out at a release position where the holding members release workpieces.

7. A workpiece conveyance device comprising:
   a base body disposed adjacent to a press machine;
   a pair of first arms whose base ends are rotatably supported relative to the base body;
   a pair of second arms whose base ends are rotatably supported at respective tips of the first arms;
   a first holding portion rotatably supported at a tip of one of the second arms; and
   a second holding portion that is independent of the first holding portion and rotabably supported at a tip of another one of the second arms, wherein each of the first and second holding portions includes a plurality of holding members which holds a workpiece,
wherein the first holding portion includes:
  a first support member which supports the plurality of holding members;
  a second support member rotatably supported at the tip of one second arm and supporting the first support member; and
  an absorption member provided between the first support member and the second support member,
wherein the second support member movably supports the first support member along an intersection direction intersecting with a conveyance direction in which the workpiece is conveyed,
wherein the absorption member allows the second support member to move in the intersection direction relative to the first support member, and returns the second support member to an initial position in the intersection direction relative to the first support member,
wherein the absorption member includes a first magnet set and a second magnet set each constituted of a set of magnets opposed to each other with same poles and disposed separate from each other between the first support member and the second support member,
wherein the first magnet set moves in such a manner as to move the second support member away from the other one of the first and second holding portions with a repulsive force generated when the second support member moves to be closer to the other one of the first and second holding portions, and
wherein the second magnet set moves in such a manner as to move the second support member to be closer to the other one of the first and second holding portions with a repulsive force generated when the second support member moves away from the other one of the first and second holding portions.

8. The workpiece conveyance device according to claim 7,
wherein each of the first and second holding portions includes the first support member and the second support member,
wherein at least one of the first and second holding portions includes the absorption member,
wherein, in a state in which the first and second holding portions holds a single workpiece, while a first distance between one of the first support members and the other one of the first support members is maintained, the absorption member is able to deform to decrease a second distance between one of the second support members and the other one of the second support members, and the absorption member is able to deform to increase the decreased second distance while the first distance is maintained.

9. The workpiece conveyance device according to claim 7,
wherein the first arm rotates about a first rotation axis relative to the base body,
wherein the second arm rotates about a second rotation axis relative to the first arm,
wherein the second support member rotates about a third rotation axis relative to the second arm, and
wherein the first rotation axis, the second rotation axis, and the third rotation axis are parallel to each other.

10. The workpiece conveyance device according to claim 7,
wherein the first support member includes a guide member, and
wherein the second support member includes a guided member which is slidably guided by the guide member along the intersection direction.

11. The workpiece conveyance device according to claim 7, further comprising a first elevator drive unit and a second elevator drive unit fixed to the base body,
wherein the first elevator drive unit lifts and lowers one of the pair of first arms relative to the base body, and
wherein the second elevator drive unit lifts and lowers the other one of the pair of first arms relative to the base body.

12. The workpiece conveyance device according to claim 7, wherein the movement of the second support member is caused in the intersection direction relative to the first support member, and the return of the second support member to the initial position are carried out at a release position where the holding members release workpieces.

13. A workpiece conveyance device comprising:
  a base body disposed adjacent to a press machine;
  a pair of first arms whose base ends are rotatably supported relative to the base body;
  a pair of second arms whose base ends are rotatably supported at respective tips of the first arms;
  a first holding portion rotatably supported at a tip of one of the second arms; and
  a second holding portion that is independent of the first holding portion and rotabably supported at a tip of another one of the second arms,
wherein each of the first and second holding portions includes a plurality of holding members which holds a workpiece,
wherein the first holding portion includes:
  a first support member which supports the plurality of holding members;
  a second support member rotatably supported at the tip of one second arm and supporting the first support member; and
  an absorption member provided between the first support member and the second support member,
wherein the second support member movably supports the first support member along an intersection direction intersecting with a conveyance direction in which the workpiece is conveyed,
wherein the absorption member allows the second support member to move in the intersection direction relative to the first support member, and returns the second support member to an initial position in the intersection direction relative to the first support member,
wherein the absorption member includes a first cylinder and a second cylinder each made of a pneumatic cylinder compressible between the first support member and the second support member,
wherein the first cylinder is compressed by the second support member moving to be closer to the other one of the first and second holding portions, and is restored in such a manner as to move the second support member away from the other one of the first and second holding portions, and
wherein the second cylinder is compressed by the second support member moving away from the other one of the first and second holding portions, and is restored in such a manner as to move the second support member to be closer to the other one of the first and second holding portions.

14. The workpiece conveyance device according to claim 13,
- wherein the first arm rotates about a first rotation axis relative to the base body,
- wherein the second arm rotates about a second rotation axis relative to the first arm,
- wherein the second support member rotates about a third rotation axis relative to the second arm, and
- wherein the first rotation axis, the second rotation axis, and the third rotation axis are parallel to each other.

15. The workpiece conveyance device according to claim 13,
- wherein the first support member includes a guide member, and
- wherein the second support member includes a guided member which is slidably guided by the guide member along the intersection direction.

16. The workpiece conveyance device according to claim 13, further comprising a first elevator drive unit and a second elevator drive unit fixed to the base body,
- wherein the first elevator drive unit lifts and lowers one of the pair of first arms relative to the base body, and
- wherein the second elevator drive unit lifts and lowers the other one of the pair of first arms relative to the base body.

17. The workpiece conveyance device according to claim 13, wherein the movement of the second support member is caused in the intersection direction relative to the first support member, and the return of the second support member to the initial position are carried out at a release position where the holding members release workpieces.

18. The workpiece conveyance device according to claim 13,
- wherein each of the first and second holding portions includes the first support member and the second support member,
- wherein at least one of the first and second holding portions includes the absorption member,
- wherein, in a state in which the first and second holding portions holds a single workpiece, while a first distance between one of the first support members and the other one of the first support members is maintained, the absorption member is able to deform to decrease a second distance between one of the second support members and the other one of the second support members, and the absorption member is able to deform to increase the decreased second distance while the first distance is maintained.

* * * * *